US011870540B2

(12) United States Patent
Avellan et al.

(10) Patent No.: US 11,870,540 B2
(45) Date of Patent: *Jan. 9, 2024

(54) SYSTEM AND METHOD FOR HIGH THROUGHPUT FRACTIONATED SATELLITES (HTFS) FOR DIRECT CONNECTIVITY TO AND FROM END USER DEVICES AND TERMINALS USING FLIGHT FORMATIONS OF SMALL OR VERY SMALL SATELLITES

(71) Applicant: AST & Science, LLC, Miami, FL (US)

(72) Inventors: Abel Avellan, Coral Gables, FL (US); Sriram Jayasimha, Bangalore (IN)

(73) Assignee: AST & Science, LLC, Miami, FL (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/215,656

(22) Filed: Mar. 29, 2021

(65) Prior Publication Data

US 2021/0218468 A1  Jul. 15, 2021

Related U.S. Application Data

(60) Division of application No. 16/359,533, filed on Mar. 20, 2019, now Pat. No. 10,979,133, which is a
(Continued)

(30) Foreign Application Priority Data

Jun. 12, 2017  (IN) .............................. 201711020428

(51) Int. Cl.
*H04W 4/00* (2018.01)
*H04B 7/185* (2006.01)
(Continued)

(52) U.S. Cl.
CPC ......... *H04B 7/18513* (2013.01); *H04B 7/024* (2013.01); *H04B 7/18519* (2013.01);
(Continued)

(58) Field of Classification Search
CPC .... H04B 7/155; H04B 7/185; H04B 7/18508; H04B 7/1853; H04B 7/18534;
(Continued)

(56) References Cited

U.S. PATENT DOCUMENTS 3,611,435 A    10/1971  Cooper
4,843,397 A    6/1989  Galati et al.
(Continued)

FOREIGN PATENT DOCUMENTS

AU    2016347539 B2    5/2021
CN    103731935 A      4/2014
(Continued)

OTHER PUBLICATIONS

Examination Report for AU Application No. 2020241308, dated Nov. 9, 2021, 3 pgs.
(Continued)

*Primary Examiner* — Matthew W Genack
(74) *Attorney, Agent, or Firm* — Botus Churchill IP Law LLP

(57) ABSTRACT

A high throughput fractionated satellite (HTFS) system and method where the functional capabilities of a conventional monolithic spacecraft are distributed across many small or very small satellites and a central command and relay satellite, the satellites are separated and flight in carefully design formations that allows the creation of very large aperture or apertures in space drastically reducing cost and weight and enabling high throughput capabilities by spatially reuse spectrum.

16 Claims, 8 Drawing Sheets

Related U.S. Application Data continuation-in-part of application No. 15/979,298, filed on May 14, 2018, now Pat. No. 11,159,228, which is a continuation of application No. 15/675,155, filed on Aug. 11, 2017, now Pat. No. 9,973,266.

(51) Int. Cl.
  *H04B 7/195* (2006.01)
  *H04B 7/024* (2017.01)
  *H04W 84/06* (2009.01)

(52) U.S. Cl.
  CPC ......... *H04B 7/18534* (2013.01); *H04B 7/195* (2013.01); *H04W 84/06* (2013.01)

(58) Field of Classification Search
  CPC .............. H04B 7/1855; H04B 7/18563; H04B 7/18567; H04B 7/18571; H04B 7/18576; H04B 7/18578; H04B 7/2041; H04W 72/046; H04W 84/06
  See application file for complete search history.

(56) References Cited

U.S. PATENT DOCUMENTS

| | | | |
|---|---|---|---|
| 5,465,096 A | 11/1995 | Nawata | |
| 5,777,582 A | 7/1998 | Raab et al. | |
| 5,810,297 A | 9/1998 | Basuthakur | |
| 5,909,299 A | 6/1999 | Sheldon, Jr. et al. | |
| 5,925,092 A | 7/1999 | Swan et al. | |
| 6,058,306 A | 5/2000 | Liu | |
| 6,157,642 A | 12/2000 | Sturza et al. | |
| 6,314,269 B1 | 11/2001 | Hart | |
| 6,975,582 B1 | 12/2005 | Karabinis | |
| 6,990,314 B1 | 1/2006 | Hagen | |
| 7,357,356 B1 | 4/2008 | Goodzeit | |
| 9,150,313 B2 | 10/2015 | Puig-Suari et al. | |
| 9,248,924 B2 | 2/2016 | Puig-Suari et al. | |
| 9,473,234 B2 | 10/2016 | Shreve et al. | |
| 9,664,726 B2 | 5/2017 | Platzer et al. | |
| 9,673,889 B2 | 6/2017 | Platzer et al. | |
| 9,973,266 B1 | 5/2018 | Avellan et al. | |
| 2001/0034206 A1 | 10/2001 | Thompson | |
| 2002/0102939 A1 | 8/2002 | Shaneyfelt | |
| 2004/0209584 A1 | 10/2004 | Bargroff et al. | |
| 2005/0248491 A1 | 11/2005 | Leyre et al. | |
| 2007/0155318 A1 | 7/2007 | Monte | |
| 2007/0184778 A1 | 8/2007 | Mechaley | |
| 2007/0250267 A1 | 10/2007 | Jaeger | |
| 2008/0087769 A1 | 4/2008 | Johnson | |
| 2008/0122690 A1 | 5/2008 | Wan | |
| 2010/0046853 A1 | 2/2010 | Goodnough | |
| 2010/0195564 A1* | 8/2010 | Jong ................. | H04B 7/18543 370/326 |
| 2010/0317293 A1 | 12/2010 | Yokoyama | |
| 2012/0217348 A1 | 8/2012 | Aguirre Martinez | |
| 2013/0113996 A1 | 5/2013 | Zhu | |
| 2013/0148696 A1 | 6/2013 | Ryu | |
| 2014/0266872 A1 | 9/2014 | Mitola, III | |
| 2015/0162656 A1 | 6/2015 | Fitz-Coy et al. | |
| 2015/0217876 A1 | 8/2015 | Halsband | |
| 2015/0249462 A1 | 9/2015 | Chang | |
| 2015/0371431 A1 | 12/2015 | Korb | |
| 2016/0011318 A1 | 1/2016 | Cohen | |
| 2016/0065006 A1 | 3/2016 | Woods | |
| 2016/0251092 A1 | 9/2016 | Cappaert et al. | |
| 2016/0253284 A1 | 9/2016 | Cappaert et al. | |
| 2016/0254857 A1 | 9/2016 | Avellan et al. | |
| 2016/0315693 A1 | 10/2016 | Richardson et al. | |
| 2017/0043885 A1 | 2/2017 | Marchandise | |
| 2017/0047987 A1 | 2/2017 | Pellegrino et al. | |
| 2017/0070939 A1 | 3/2017 | Chong et al. | |
| 2017/0099095 A1 | 4/2017 | Wang | |
| 2017/0156069 A1 | 6/2017 | Moshfeghi | |
| 2017/0188322 A1* | 6/2017 | Calmettes ............. | G01S 5/0231 |
| 2017/0250751 A1 | 8/2017 | Kargieman | |
| 2017/0254905 A1 | 9/2017 | Reis | |
| 2017/0285178 A1 | 10/2017 | Platzer | |
| 2017/0300654 A1 | 10/2017 | Stein | |
| 2018/0241464 A1 | 8/2018 | Michaels | |
| 2018/0359022 A1 | 12/2018 | Avellan et al. | |

FOREIGN PATENT DOCUMENTS

| | | |
|---|---|---|
| EP | 3109659 A1 | 12/2016 |
| GB | 1282789 A | 7/1972 |
| GB | 2536017 A | 9/2016 |
| JP | S-6170823 A | 4/1986 |
| JP | H06170823 A | 6/1994 |
| JP | 2002095190 A | 3/2002 |
| JP | 2015204621 A | 11/2015 |
| WO | 2016153823 A1 | 9/2016 |
| WO | WO-2018/231714 A1 | 12/2018 |

OTHER PUBLICATIONS

Notification of material filed by a third party received in AU Application No. 2020241308, mailed Jan. 27, 2022, 3 pages.
Office Action for KR Application No. 10-2019-7038780, dated Jul. 19, 2022.
Extended European Search Report for EP Application No. 20774081.2, dated Nov. 15, 2022.
Examination Report for EP Application No. 17192639.7, dated Sep. 28, 2018, 5 pages.
International Search Report and Written Opinion for PCT/US18/36929, dated Aug. 31, 2018, 11 pages.
Rainey K., "CubeSats: Shaping Possibilities in Space," Feb. 22, 2017, https://www.nasa.gov/mission_pages/station/research/news/cubesats_possibilites, 3 pages.
Williams, K., "NASA Small Satellites to Demonstrate Swarm Communications and Autonomy," Dec. 7, 2015, https://www.nasa.gov/feature/nasa-small-satellites-to-demonstrate-swarm- communications-and-autonomy, 2 pages.
Gaudin S., "Swarms of smart nano-satellites may offer global connectivity (with video)," Sep. 15, 2015, Computerworld, https://www.computerworld.com/article/2983637/emerging-technology-swarms-of-smart-nano-satellites-may-offer-global-connectivity-with-video-html, 6 pages.
"ISRO sets new world record, successfully puts 104 satellites into Earth's orbit," India TV News Desk, Feb. 15, 2017, http://www,.indiatvnews.com/news/india-countdown-begins-india-to-launch-record-104-satellites-on-single-rocket-368925, 8 pages.
Konechy G., "Small Satellites—A tool for Earth observation?" Jan. 2004, https://www.researchgate.net/publication/229028414_Small_satellites-A_tool_for_Earth_observation?, 4 pages.
NODES—Spacecraft network operations demonstration using multiple spacecraft in an autonomously configured space network allowing crosslink communications and multipoint scientific measurements, National Aeronautics and Space Administration, www.nasa.gov. Aug. 1, 2016, 2 pages.
International Search Report & Written Opinion for PCT/US20/21215, dated Jul. 1, 2020, 12 pages.
Examination Report No. 1 issued in corresponding Australian Patent Application No. 2022201566, dated Mar. 30, 2023, 5 pages.
The First Examination Report for Indian Patent Application No. 201711020428, dated Dec. 17, 2019.
First Office Action issued in corresponding Indian Patent Application No. 202117043217, dated Aug. 24, 2023, 6 pages.

* cited by examiner

R - RED  G - GREEN  B - BLUE  Y - YELLOW

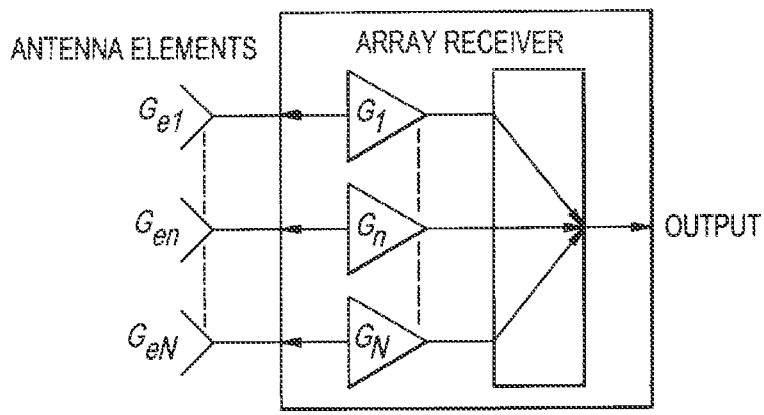
FIG. 4
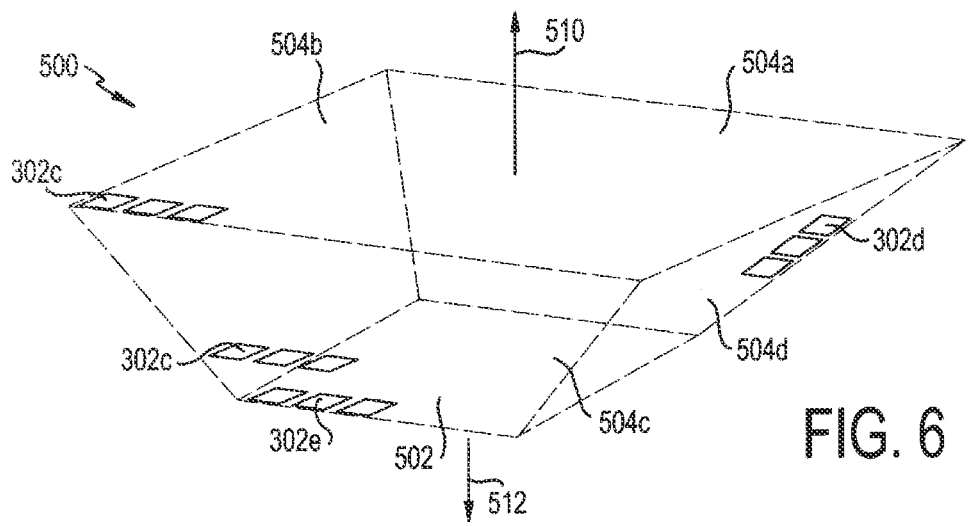
FIG. 6
FIG. 7(a)  FIG. 7(b)  FIG. 7(c)
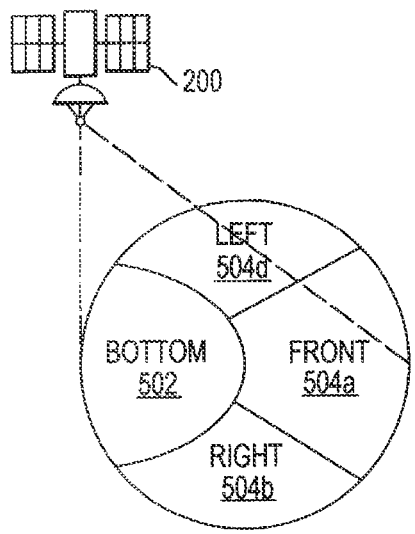 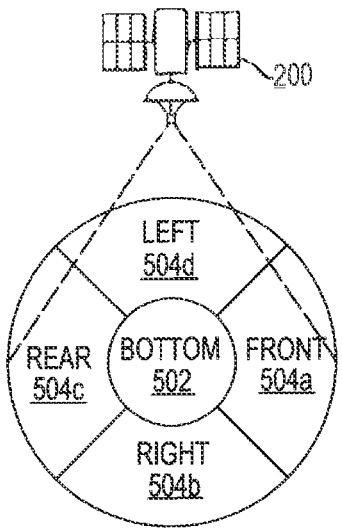 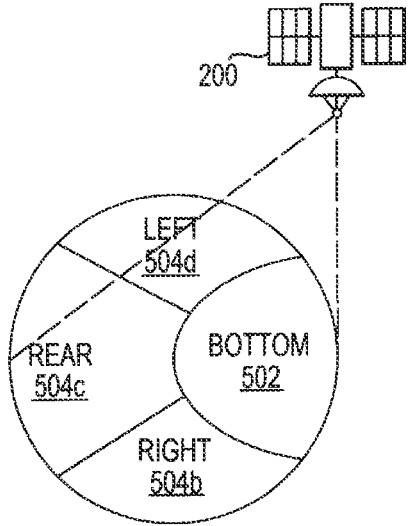

SYSTEM AND METHOD FOR HIGH THROUGHPUT FRACTIONATED SATELLITES (HTFS) FOR DIRECT CONNECTIVITY TO AND FROM END USER DEVICES AND TERMINALS USING FLIGHT FORMATIONS OF SMALL OR VERY SMALL SATELLITES

RELATED APPLICATION

This application is a divisional of U.S. patent application Ser. No. 16/359,533, filed Mar. 20, 2019, which is a continuation-in-part of U.S. patent application Ser. No. 15/979,298, filed May 14, 2018, which is a continuation of U.S. patent application Ser. No. 15/675,155, now U.S. Pat. No. 9,973,266, filed Aug. 11, 2017, which claims priority to India Provisional Application No. 201711020428, filed Jun. 12, 2017. The entire contents of those applications are incorporated herein by reference.

BACKGROUND OF THE INVENTION

Field of the Invention

The present invention relates to a high throughput fractionated satellite (HTFS) system and method where the functional capabilities of a conventional monolithic spacecraft are distributed across many small or very small satellites and a central command and relay satellite. The satellites are separated and fly in design formations that allow the creation of very large aperture or apertures in space. The aperture generally refers to the area of an antenna and relates to the ability of the antenna to receive and transmit signals. As the aperture increases, the effectiveness of the antenna in receiving, transmitting and directionality of signals also increases.

Furthermore, LEO satellites generate prodigious Doppler at the edge of their field-of-view (FOV) depending on their velocity and the carrier frequency. In a communication system comprising low-cost user equipment (UE) and a Ground Station (GS), this Doppler can be compensated either at the satellite or in GS equipment depending on the geo-location of the UE, the satellite ephemeris, the geo-location of the GS, the carrier frequencies for UE-to-satellite linking and the carrier frequencies for GS-to-satellite linking. It is advantageous to correct Doppler to a beam-center rather than each UE individually; however, this results in a differential Doppler depending on the beam-diameter. The smaller a beam (the larger the aperture), the smaller the differential Doppler. Thus the size of the aperture is also dictated by the maximum differential Doppler that the UE-to-Base Station (in satellite case, UE to GS) communication system can tolerate.

More particularly, the present invention relates to an array system of small or very small satellites and a central command and relay satellites. The array of small or very small satellites are coordinated to act as a large aperture in space. This reduces weight and power requirements and results in a drastic reduction in cost and drastic improvement in aperture gain and bandwidth reuse performance. Satellites can be partially connected or structurally unconnected and keep in close proximity using electromagnetic forces, solar forces and other natural orbit related forces aided by GPS systems and positioning.

Background of the Related Art

Present antennas are monolithic and are either fed power via a parabolic reflector or comprise phased arrays of many antenna elements. In both of these cases, the antenna aperture is structurally one and limited in size to typically few square meters. The main issues with deployment of large antenna structures in space are twofold. First, cost and weight drastically increase with size due to the cost of launching large and heavy objects into space. And second, any pre-fabricated structure (including deployment mechanisms and support structures) must withstand large accelerations at launch and its strength has to be designed to take into account these forces rather in than the micro-gravity operating environment.

Spacecraft component weight and cost are related to the required payload power of a particular satellite mission. Payload power requirements are mostly driven by end user terminals required to target Signal to Noise ratio, number of simultaneous users and channel bandwidth requirements. As the payload power requirement increase the RF components, batteries, solar panels and other power handling components on the satellite also increase in weight and cost. In addition, as end user devices and terminals (such as handheld devices, very low power terminals like modern smartphones, geo location bracelets, radios, telephones, cellular, smart phones, IoT terminals, and bracelets for tracking people or machine tracking devices, collectively referred to herein as "end user devices" or "end user terminals") become smaller and lighter, their transmitting power and directionality require larger apertures in space in order to enable direct connectivity from and to those end user devices and terminals.

State of the art LEO communications satellites designed to connect directly to end user devices like satellite phones or low power IOT devices, weigh between 500 to 1,000 kg and are costly to build and launch.

SUMMARY OF THE INVENTION

One object of the present invention is to provide a distributed aperture system having the capabilities of a large or very large antenna deployed in space ranging but not limited from 25 $m^2$ to 300,000 $m^2$ in aperture surface. Another object of the invention is to provide an aperture system in space that minimizes or entirely reduces pre-fabricated structure. In accordance with these and other objects, the present invention includes an array of very small or small satellites, coordinated to act as a large aperture, but that are partially connected or structurally unconnected.

There are several advantages to this approach. First, the interstitial mass of connecting elements is eliminated, reducing satellite launch weight, and hence launch cost. Second, very large apertures can be realized in space and this is of particular advantage in realizing high antenna efficiencies at relatively low frequencies. And third, bandwidth that is scarce and expensive can be re-used spatially more than tens of thousands of times, thereby enabling high throughput capabilities by realizing narrow-beams and beam forming using distributed signal processing algorithms at both the small and very small satellites and the control and relay satellites.

The HTFS equivalent antenna aperture drastically increases in size due to the use of a distributed satellite aperture. As a result, the required size for RF components, batteries, solar panels and power handling components is drastically reduced in size or is eliminated, as in the case of waveguide systems of monolithic satellites. This also drastically reduces the weight and cost required for the satellite system.

Another benefit is the reduction on the required power levels by each discrete satellite. The HTFS architecture of the present invention utilizes commercial of the shelf components that are built in millions of units for consumer electronics. Critical components required in HTFS system like Software define radios, HPA, LNA and Filters then become available as commercial of the shelf components already optimize for weight and cost.

HTFS systems described in this invention, when compared with monolithic satellites, require a fraction (approximately one-tenth) of the weight compared to a monolithic satellite for an equivalent number of end users and similar bandwidth requirements. For example, an equivalent capability monolithic satellite that weighs 1,000 kg can be constructed using a HTFS according to the present invention with a collective weight of approximately 100 kg, providing a drastic reduction in weight and cost.

The HTFS system described in this invention creates an equivalent very large distributed aperture provides great benefit on cost, weight and Spectrum re-use. These benefits are particularly obvious for spectrum between 100 MHz and 2 GHz typically use for direct connectivity to end user terminals. The low frequency spectrum (e.g., between 100 MHz to 2 GHz) is particularly good for eliminating the use of antennas, gateways or VSAT systems between the end user and the HTFS systems in space. Loses caused by buildings, trees, airplane fuselage, train, car and vessels structures and other obstructions to the line of sight get reduce as compared to higher frequency systems like V, Ka, Ku, C, X. In addition, costly and heavy satellite tracking system at end user terminals required on higher frequency spectrum are eliminated at lower band frequencies. Also, low band frequencies connecting to an HTFS system of the present invention allow end user devices to connect directly to the HTFS system without VSAT terminals or costly and heavy tracking antennas enabling numerous applications and usage for this invention.

These and other objects of the invention, as well as many of the intended advantages thereof, will become more readily apparent when reference is made to the following description, taken in conjunction with the accompanying drawings.

BRIEF DESCRIPTION OF THE FIGURES

FIG. 4 is a general array receiving system for each small satellite 302 and for the satellite array 300 as a whole;

FIG. 6 shows an alternative arrangement of small satellites in an array having a trapezoidal configuration;

FIG. 7(a) shows the formation entering the footprint for the array of FIG. 6;

FIG. 7(b) shows the formation in the middle of the footprint for the array of FIG. 6;

FIG. 7(c) shows the formation leaving the footprint for the array of FIG. 6;

DETAILED DESCRIPTION OF THE PREFERRED EMBODIMENTS

Figure 1A:
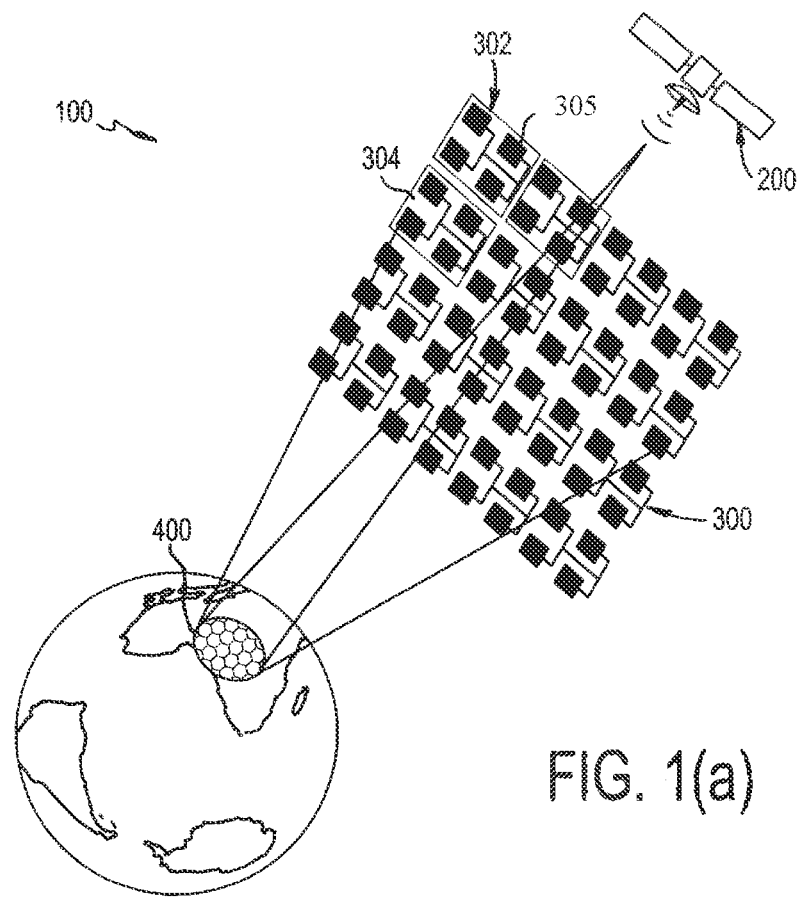
FIGS. 1(a), (b) show the satellite communication system in accordance with the preferred embodiment of the invention

In describing the preferred embodiments of the present invention illustrated in the drawings, specific terminology is resorted to for the sake of clarity. However, the present invention is not intended to be limited to the specific terms so selected, and it is to be understood that each specific term includes all technical equivalents that operate in a similar manner to accomplish a similar purpose.

Turning to the drawings, FIG. 1(a) shows the satellite communication system or HTFS 100 in accordance with one exemplary, illustrative, non-limiting embodiment of the invention. The satellite system or satellite formation 100 includes a plurality of small or very small elements such as small or very small satellites 302 (e.g., slave or remote satellites) and a local controller and relay satellite 200 (e.g., master or central satellite, also referred to here as the control satellite). The satellites 302 can be any suitable satellite such as for example, altitude-controlled very small satellites 302 that are very small in size and can be lightweight (e.g., <1.5 Kg in weight). As an alternative, many antenna elements may be integrated into a single assembly, the advantage of this being that some of the interstitial spacing between elements can also be used by solar cells in order to enhance power available to those elements. For example, as shown, each remote satellite can have a housing 304 that houses four antennas 305 that can be electrically connected together by a wire. For ease of illustration, only three remote satellite housings 304 are shown in FIG. 1(a).

The remote satellites 302 are operated in Low Earth Orbit (LEO). The small satellites 302 operate below the Van Allen belt of plasma at 700 km/1400 km because operating above the Van Allen Belt requires more expensive space-hardened components. However, the invention is not limited to operate in any particular orbit or combination of orbits, and other suitable orbits can be utilized on all LEO, MEO and GEO orbits, including above the Van Allen Belt.

The system 100 (including the central satellite 200 and the small satellites 302) has two primary configurations: an operating configuration, and a shipping or storage configuration. In the operating configuration, a plurality of the small satellites 302 are formed together in space to form an array 300. In one example embodiment, one-thousand (1,000) small satellites 302 are provided, though any number of small satellites 302 can be provided, including substantially greater or fewer than 1,000. The array 300 forms a very large spatial array 300. In the example embodiment of 1,000 small satellites 302, the array 300 can be over 500 meters in width and/or height. In the array configuration, the small satellite 302 antennas are equivalent to a large antenna that enhances communication with the Earth. The remote satellites 302, in essence, are fractionated in that they provide a distributed phased-array antenna, rather than a monolithic or connected array.

Also in the operating configuration, the array 300 is formed about the central satellite 200. The array 300 is positioned and configured to face the Earth. That is, the array 300 defines a top surface that can be linear or curved, and that top surface generally faces the Earth. The larger satellite 200 is positioned substantially at the centre of mass of the array 300 formation. The small satellites can be positioned approximately a few centimetres to approximately 20 meters apart from each other.

In addition, the system 100 and the small satellites 302 can be placed in a storage or transport configuration. The small satellites 302 are separate discrete devices and are not physically connected to one another. The small satellites 302 can be consolidated or combined together for storage and transportation and then formed into the large satellite array 300 in space. For example in the shipping configuration, multiple small satellites 302 can be placed together in a single shipping container such as a box, for transport on a rocket or other transport device or space craft. Once the shipping container(s) reaches a release position in space at a desired orbit, the shipping container can be opened and the small satellites 302 can be released. The small satellites 302 can then automatically manoeuvre by themselves and/or with the assistance of the control satellite 200, to enter into the operating configuration array in space. The central satellite 200 can be already positioned in space. Or the central satellite 200 can be transported in a separate shipping container and separately positioned in space either before or after the array 300 is formed.

This reduces the space required by the small satellites 302 during transport, but enables the small satellites 302 to form a large array when in the operating configuration. The small satellites 302 can take up a space of a few square meters depending on the number of satellites 302, which converts to many square meters when deployed in space. This also substantially reduces the complexity of the array 300 and the launch mass because structural members are not needed to connect the small satellites 302 to each other or to the controller satellite 200 in the operating configuration. Thus, the satellite array 300 can be formed with minimal human intervention (such as to release the satellites 302 from the shipping container and space craft), and can even be formed without any physical human intervention (such as to build a frame or other structure for the array). In addition, multiple arrays 300 can be provided at various locations in space to form a constellation of satellite arrays 300 to obtain full communication coverage of Earth. For instance, approximately 50-100 arrays 300 located at LEO orbits can be provided to obtain complete continuous coverage of Earth.

It should be noted that the remote satellites 302 can be moved and positioned in any suitable manner. In one embodiment shown in FIGS. 2(a), 2(b), the remote satellites 302 and central satellite 200 are provided with impulse actuators such as one or more electromagnetic coils 314 and with magnetorquers 316 to move the remote satellites 302.

Figure 2A:
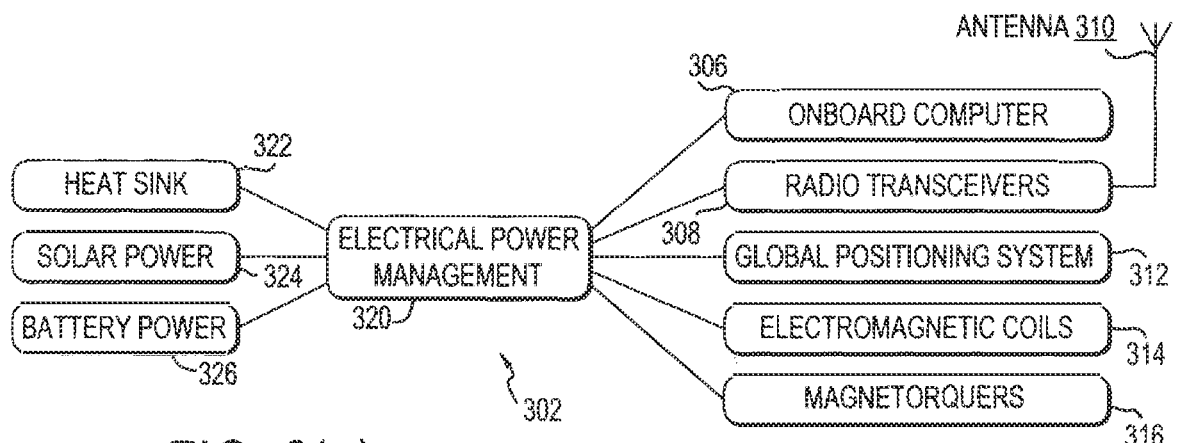
FIGS. 2(a) and 2(b) are block diagrams of the system of FIG. 1.

In more detail, FIG. 2(a) is a block diagram of the small or very small remote satellites 302. The remote satellites 302 include a processing device 306, radio transceivers 308 in communication via an antenna 310, a GPS 312, electromagnetic coils 314, magnetorquers 316, electrical power management 320, heat sink 322, solar power 324, and battery power 326. The remote satellite 302 components are divided in two parts, those related to energy management and those related to the use of the energy. The electrical power is obtained from different sources like heat, light or chemical. These components are the heat sink 322, the solar power 324 and the battery power 326, respectively. Communications between remote satellites 302 or between a remote satellite 302 and the central satellite 200 are done by the radio transceiver 308 and the antenna 310.

Figure 2B:
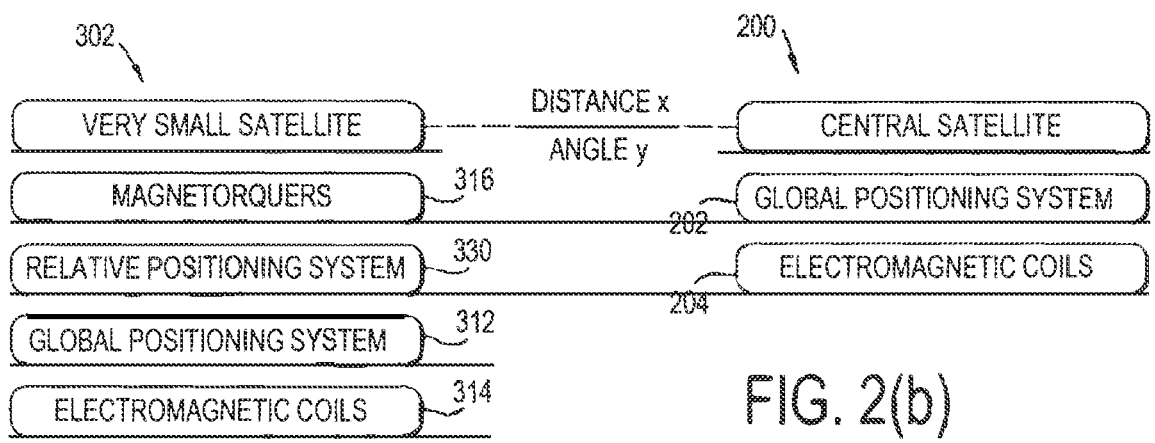

FIG. 2(b) is a block diagram of the electromagnetic system for maintaining a constant relative position between the remote satellites 302 and between the remote satellites 302 and the central satellite 200. Referring to FIGS. 2(a) and 2(b), satellite positioning is done in terms of distance x and angle y. The onboard computer or processing device 306 computes the required maneuvers to maintain a predetermined or dynamically-determined desired (which can be variable or random) distance x and angle y for the remote satellite 302 with respect to the other remote satellites 302 and with respect to the central satellite 200. It does this by comparing the relative position of the remote satellite 302 with the other remote satellites 302 and with the central satellite 200. The electromagnetic coils 314 generate electromagnetic forces to gain movement by changing the relative distance between the remote satellite 302 and other remote satellites 302 or between the remote satellite 302 and the central satellite 200. It is noted that FIG. 2(b) shows the distance and angle between the remote satellites 302 and the central satellite 200. It will be appreciated that the distance and angle is also maintained between the remote satellites 30 themselves, in the same manner.

The magnetorquer 316 generates rotations around the satellite center of mass to control the angle y with respect to other remote satellites 302 or with respect to the central satellite 200. The global positioning system 312 compares the relative satellite position with respect to the global position.

The central satellite 200 is the reference of the satellite array and it has to know its global position via the GPS 202, but it does not need to know its relative position. Thus, the central satellite 200 does not use magnetorquers (as in the remote satellites), only electromagnetic coils 204. The electromagnetic formation flight system maintains the desired distance x and the desired angle y between each small satellite 302 and/or the central satellite 200, by generating electromagnetic forces and/or rotations. The electromagnetic coils 314 control the distance x by comparing its position with respect to the one obtained from the Global Positioning System 312.

It will be recognized, however, that the GPS 312 is optional in the remote satellite 302. The central satellite 200 includes a GPS 202, which means that the remote satellites 302 only need to know its relative position to the neighboring and/or surrounding remote satellites 302 and the relative position between that remote satellite 302 and the central satellite 200. However, one or more of the remote satellites 302 in the array 300 can use the GPS 312 to determine its global position to further facilitate positioning of the remote satellite 302. In that instance, it is possible for the GPS 202 of the central satellite to be omitted and the central satellite 200 to only use its relative position to one or more of the remote satellites 302.

The magnetorquers 316 control the angle y by measuring the relative position. The corrections are done through a number of maneuvers until the position and the angle are stable. Then corrections are only required when any disturbance occurs like high charged particles (i.e., cosmic ray, Van Allen belt charged particles, etc.) impacting to a particular satellite. The solar wind, the orbit rotation or the interaction between satellites are not considered disturbances because they are predictable and are part of the maneuvers.

It is noted that electromagnetics are used to maintain the distance between remote satellites 302 within an operating range and between the remote satellites 302 and the control satellite 200 within an operating range. However, the invention also makes use of first order gravitational forces between the remote satellites 302 and Earth and between the control satellite 200 and Earth, as well as due to the natural orbit of the remote satellites 302 and the control satellite 200. The invention positions the remote satellites 302 and the control satellite 200 to make use of that gravitational force and minimize the amount of positioning that has to be done by using the electromagnetics or other outside forces. In addition, the gravity forces create an orbit for the satellites 302, 200. The invention uses the natural orbit of the satellites 200, 302 to maintain the position of the remote satellites 302 in the array 300, as well as the position of the control satellite 200 with respect to the remote satellites 302. Finally, the array 300 and control satellite 200 naturally rotates, and the array 300 and position of the satellites 200, 302 are configured to account for the natural rotation and minimize positional adjustments of the satellites 200, 302 needed due to that rotation. For example, an algorithm can be utilized by the control satellite 200 to dynamically adapt to volumetric shape rotation of the remote satellites 302, and/or to dynamically adapt to relative position of the remote satellites and the target beam object or geography. That algorithm can account for gravitational forces, the natural orbit, and rotation.

Figure 1B:
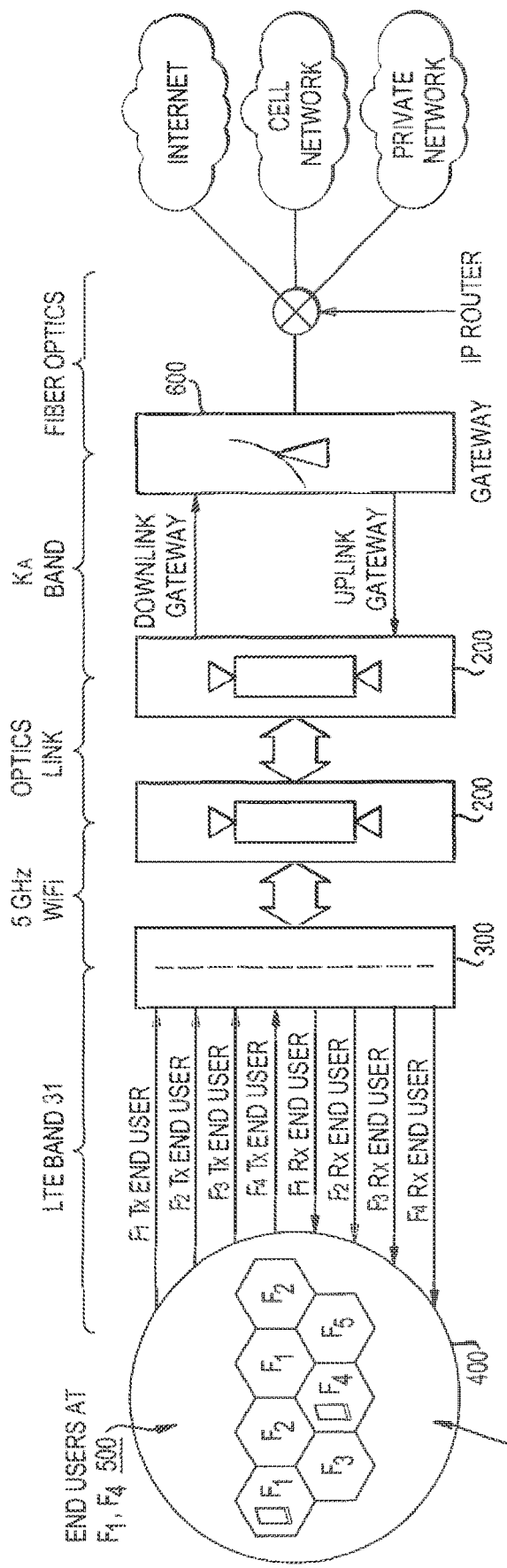

FIGS. 1(*a*), 1(*b*), 2(*a*), 2(*b*) are block diagrams of the system 100 showing central satellite 200 to very small satellites 302 communications via wireless communication network. The remote satellites 302 include a remote controller 304 (e.g., processor or processing device) with a control interface, antenna 305, and a transmitter and/or receiver. The transmitter/receiver communicate with the controller satellite 200 such as via wireless communication network. The satellites 302 are solar-cell powered and have a chargeable capacitor or battery for eclipses or the like.

The satellites 302 can include an avionic system that includes electromagnetics or the like to position the satellites 302 in the array formation that is controlled by the controller 304. The avionic system maintains the satellite 302 at the proper altitude, location and orientation, such as to maximize communications with devices on the Earth and the communication footprint and also to maintain the satellites 302 together in an array 300 formation. The remote satellite 302 can also communicate with other remote satellites 302 to achieve the proper avionics.

Electromagnetic forces are utilized between the small remote satellites 302 and the control satellite 200 to keep the remote satellites 302 in formation and alignment and for distribution of power. The additional mass associated with the generation of magnetic forces is much lower than the mass of structural connections between elements and, potentially, their deployment mechanism.

The central controller satellite 200 is provided for each array 300. In one embodiment, the controller satellite 200 can be a CubeSat or a small satellite. The controller satellite 200 communicates with each of the small satellites 200. For example, the controller satellite 200 can have a central controller (e.g., processor or processing device) that communicates with the remote controller 304 of each of the remote satellites 302. The central controller can control operation of the remote satellites 302 via remote controller 304, such as during normal communications between the central satellite 200, the remote satellites 200, and the ground station, and can implement commands to the remote satellites 200 that are received from the ground station. The central controller can control formation of the remote satellites 302 into the array 300. The central controller can also position the central satellite 200 to avoid electromagnetic shading or occlusion by the array 300 and to control communication frequencies during deployment and operation.

The remote satellites 302 can be of any shape. In addition, the satellite array 300 is either square, rectangular, hexagonal or circular in shape, with the remote satellites 302 aligned with each other in rows and columns, whereby the array is a two-dimensional array (i.e., the rows and arrays are in an x- and y-coordinate). The remote satellites 302 are controlled to be spaced apart from each other by a predetermined distance (or in an alternative embodiment, the distances can vary for each remote satellite 302 and can be dynamically controlled the remote satellite 302 and/or control satellite 200). However, any suitable size and shape can be provided for the satellites 302 and the satellite array 300, as well as for the spacing, and the array can be three-dimensional.

Referring to FIG. 1(*b*), the communication scheme is shown. The end user terminal 500 communicates with a multitude of satellites 302 via a sub 2 Ghz frequency. This frequency is called the Tx end user frequency. As shown, and as more fully discussed with respect to FIG. 10 below, the ground footprint cells each communicate on one of four different frequencies. That is, the end user terminal 500 in a first footprint cell communicates at a first frequency $F_1$, the end user terminal 500 in a second footprint cell communicates at a second frequency $F_2$, the end user terminal 500 in a third footprint cell communicates at a third frequency $F_3$, and the end user terminal 500 in a fourth footprint cell communicates at a fourth frequency $F_4$. Thus, the frequencies $F_1$-$F_4$ are reused multiple times (i.e., to communicate with end user terminals located in multiple different footprint cells), which enables a high throughput bandwidth. Multiple end user terminals 500 that are located in the same cell (e.g., the first footprint cell), can communicate over the same frequency (i.e., the first frequency $F_1$) by use of time division multiplexing or other suitable transmission scheme.

The multitude of satellites 302 and the control satellite 200 form a WIFI wireless network to communicate between them in order to aggregate the satellite 302 receive signals at the control satellite 200 and to aid the positioning satellite system. As shown, there can be multiple control satellites 200 that communicate with each other or with a given array 300. The control satellite 200 communicates with a gateway 600 (which for example can be located at a ground station on Earth) via a high frequency like KA band or V Band, which in turn communicates with the Internet, cellular systems or a private network (such as via a fiber optic link or other link). This frequency is call downlink gateway frequency. The gateway 600 communicates back to the control satellite 200, also via a high frequency. This frequency is call uplink gateway frequency.

The control satellite 200 and the multitude of satellites 302 form a Wifi wireless network to communicate between them. Thus, the control satellite 200 can distribute signals to different small satellites 302 in such a way that transmit signals to the Earth generate specific beam forming 400 on the Earth field of view. The multitude of small satellites 302 transmit back to the end user devices 500. This frequency is called the RX end user frequency, and can be a low frequency. The $F_1$ Rx is the same band, but different frequency as $F_1$ Tx. The same transmit frequency is reused in multiple cells—that is, $F_1$ Tx is the same in each of the multiple Ft cells, and the $F_1$ Rx is the same in each of the multiple $F_1$ cells; and $F_4$ Tx is the same in each of the multiple $F_4$ cells, and the $F_4$ Rx is the same in each of the multiple $F_4$ cells, etc.

The main frequencies are the transmit end user frequency Tx, the receive end user frequency Rx, the network (between the remote satellites 302 and the central satellite 200) frequency, the downlink gateway frequency and the uplink gateway frequency. The end user frequency Tx for example can be the LTE band 31. The Rx end user frequency can be the LTE band 31. The WiFi AC network frequency can be 5

GHz. The downlink gateway frequency can be the Ka band. And, the uplink gateway frequency can be the Ka band uplink.

Thus, the Up- and Down-links between the controller satellite 200 and the ground gateway (located on Earth) is via a high-frequency, and the system can be designed to communicate to other satellite systems in space over different communication bands in order to reduce the number of gateways required on Earth. Thus, the satellites 302 communicate with the end user device or terminals in low-frequencies and with the central satellite 200 via wireless communication network equivalent to WiFi. The system is capable of operating in Low Frequency connecting user devices and user terminal directly from and to the array 300 using low frequencies preferred for Moderate Obstacle Loss. Examples of frequency bands within the range of 100 MHz-2 GHz.

Figure 3:
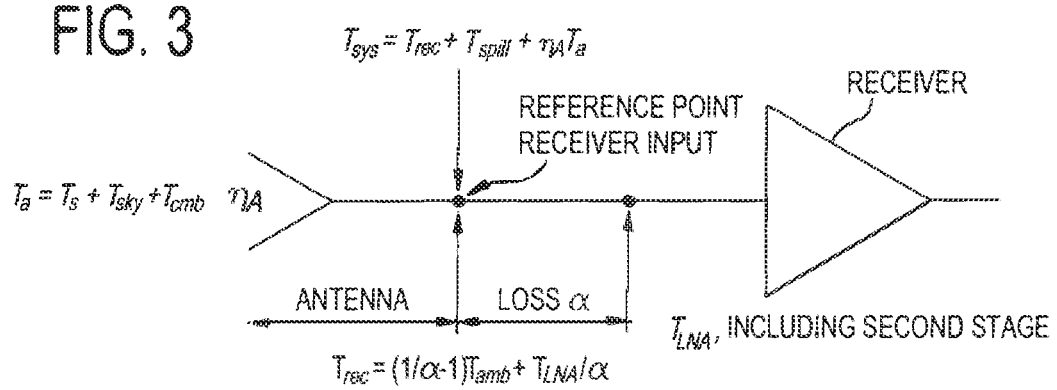
FIG. 3 shows the noise temperature in a single-channel receiver.

The G/T and EIRP (Equivalent Isotropic Radiated Power) of the distributed antenna system array in Space determines the number of bits per Hertz, frequency reuse and required power in each small or very small satellite. In order to derive this, FIG. 3 shows the noise temperature in a single-channel receiver. The following derives the antenna array's G/T of the satellite array 300 from a single channel receiver model.

FIG. 4 is a general array receiving system for each small satellite 302 and for the satellite array 300 as a whole. The signal power at beam-forming network's output is:

$$S_o = P_o G_m \left| \sum_{n=1}^{N} (\sqrt{G_{en}}) a_n \exp(j\theta_n) \right|^2$$

where $P_o$ is the lossless isotropic antenna's power output, $G_{en}$ is array antenna element gain, $G_n$ is available gain of a channel from the output of the n-th antenna element to the beam former output, $G_m$ is the maximum value of $G_n$, used for normalization and $a_n=\text{Sqrt}(G_n/G_m)$ is the effective amplitude taper of the i-th receiver channel transfer function. $\theta_n$ is the total phase shift of the n-th receiver channel with respect to that of the reference channel, accounting for beam steering and/or a phase taper.

Substituting the power gain of an array antenna $$G_s = \left| \sum_{n=t}^{N} (\sqrt{G_m}) a_n \exp(j\theta_n) \right|^2 / \sum_{n=1}^{N} a_n^2$$

in the above equation, we get $$S_o = P_o G_a G_m \sum_{n=1}^{N} a_n^2.$$

The array receiving system may be represented by an equivalent single antenna with output $P_o G_a$ and a two-port receiver with $$G_{rec} = G_m \sum_{n=1}^{N} a_n^2 = \sum_{n=1}^{N} G_n.$$

The effective input noise temperature of the array receiver is $$T_{rec} = \frac{\sum_{n=1}^{N} G_n T_n}{G_{rec}} = \frac{\sum_{n=1}^{N} G_n T_n}{\sum_{n=1}^{N} G_n}.$$

The excess output noise density is $N_o = kTG_{rec} + kT_0(1-G_c)$. Therefore, the noise temperature is $$T_{rec} = T + \frac{T_0}{G}\left(\frac{1}{G_c} - 1\right).$$

For downlink multi-beam coverage, we select the size of the n×n array, i.e., its gain and noise temperature in order to meet the field-strengths, $$E = \frac{\sqrt{30 P_T G_T}}{r} \text{V}/m,$$

according to Table 1 below, where the satellite array formation maintains the same field strength from the satellite (above) as provided by terrestrial base stations use on cellular systems (below).

TABLE 1

| Mobile System | Average TIS [dBm] | Electrical fieldstrength [mV/m] |
|---|---|---|
| GSM900 | −91.8 dBm | 177 µV/m |
| GSM1800 | −93.7 dBm | 277 µV/m |
| UMTS900 | −96.4 dBm | 104 µV/m |
| UMTS2100 | −99.6 dBm | 163 µV/m |

As best illustrated in FIG. 5, the control satellite 200 of each satellite formation 100 can handle beam-switching. For example, a given region (such as having a 400 km diameter) is designated with a beam index corresponding to a particular set of longitudes and latitudes, and the beams are mapped worldwide with each beam having a unique index. That information can be stored in memory at the control satellite 200. The control satellite 200 (for example based on its global position determined from its GPS 202), determines which beam it should transmit to at any given time. In one preferred embodiment of the invention, each beam will only communicate with a single satellite formation 100. Accordingly, there is no overlap in beams, or minimal overlap, and the satellite formations 100 will conduct beam-switching as the formations 100 move into and out of a particular beam. To minimize beam switching, the satellite formation 100 assigned to a particular beam will be the formation 100 from the entire constellation of formations 100, that covers that beam location for the longest duration, i.e. period of time. The control satellites 200 can communicate their position to the other control satellites 200 to facilitate the beam switching operation.

Figure 5A:
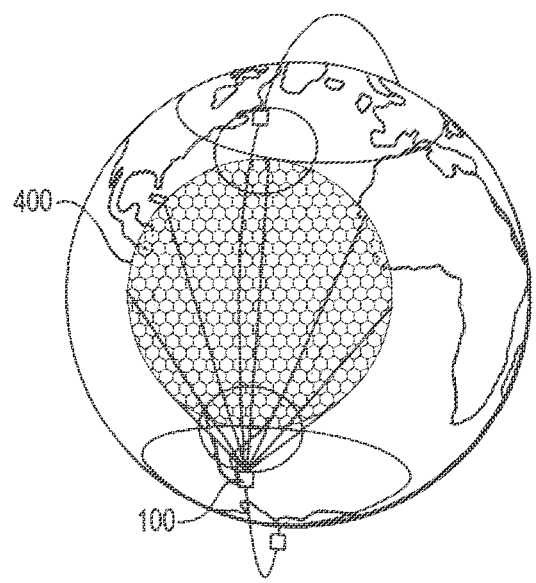
FIGS. 5(a), (b), (c) show the communication footprints on Earth and beam switching.
Figure 5B:
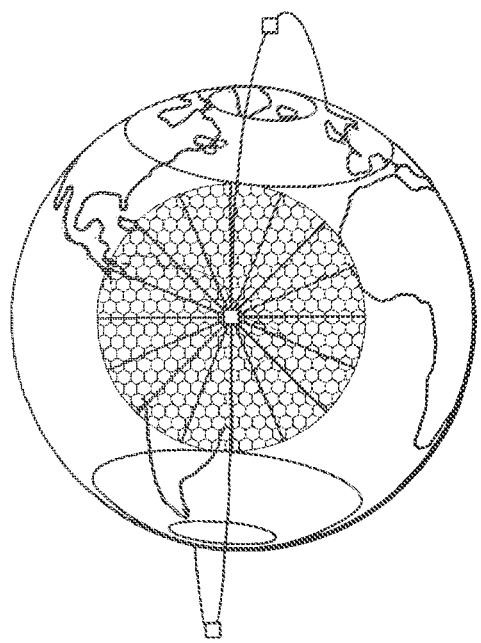
Figure 5C:
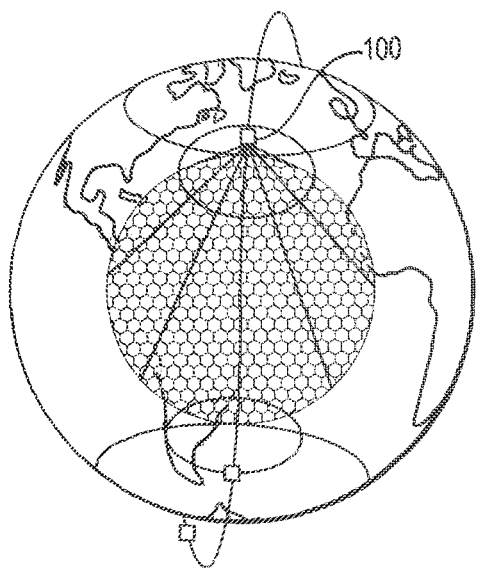

FIGS. 5(a)-5(c) depict communication protocol for beam-switching for purposes of illustrating the invention. Three (fixed) multi-beam footprints 400 are shown. Many fixed footprints tessellate (i.e., cover) the Earth, perhaps with some overlap between footprints. FIG. 5 shows a satellite formation 100 (which includes the control satellite 200 and the array 300) as it orbits the Earth and approaches a footprint (FIG. 5(a)), then passes over that footprint (FIG.

5(b)), and finally moves away from that footprint (FIG. 5(c)). A first satellite formation 100 provides communication coverage for given first multi-beam footprint until an adjacent multi-beam is nadir (immediately below the satellite). At this point, the first formation 100 switches to serving an adjacent second multi-beam footprint under it. Simultaneously, a rising second formation switches its multi-beam footprint so as to provide continuous coverage to the first multi-beam footprint. The beam-switching happens at the formation based on its ephemeris, i.e., when it starts to leave the multi-beam footprint and another formation starts to serve the multi-beam footprint. The control satellite 200 can communicate the appropriate communication protocol (frequency, etc.) to the remote satellites 302. Though beam-switching is described as being performed by the control satellite 200, it can be performed by one or more of the remote satellites 302.

The control satellite 200 commands the remote satellites 302 by sending them the beamforming coefficients. The controller satellite 200, at Ka-band or higher frequency, is based on the aggregation of array's 300 beams. The aggregation of all beams must be communicated by the control satellite to the Ground Station (and thence the network cloud) via its high-frequency downlink, while it distributes data uplinked to it in Ka band to the various very small satellites for communication to the hand-sets.

Turning to FIG. 6, an array 500 is shown in accordance with an alternative embodiment of the invention. The array 500 is formed by the small satellites 302 being positioned in a trapezoidal configuration substantially having the shape of a frustrum of a pyramid with a bottom array 502 and side arrays 504a-504d. That is, the bottom array 502 is formed by small satellites 302e positioned in rows and columns along the tracks of ellipses to form a bottom array 502 of satellites. And each of the side arrays 504a-504d (front side array 504a, right side array 504b, rear side array 504c, and left side array 504d) are formed by the small satellites 302 being positioned in rows and columns along the tracks of ellipses orthogonal to the radio of the earth.

Several small satellites 302c, 302d, 302e are shown in FIG. 6 to illustrate the trapezoidal array 500, though it will be recognized that the entire trapezoidal array 500 is comprised of small satellites 302 positioned along the bottom 502 and sides 504 of the array 500. For example, the side array 504c is formed by small satellites 302c being formed in columns and rows along the tracks of ellipses orthogonal to the radios of the earth and the side array 504d is formed by small satellites 302d being formed in columns and rows along the track of ellipses orthogonal to the radios of the earth. The bottom array 502 can be substantially square or rectangular or an ellipse and the side arrays 504 can each substantially have an isosceles trapezoid shape. Thus, the side arrays 504a-504d are angled outwardly from the planar surface of the bottom array 502, and can either be adjacent to each other or spaced apart. Notably though, each of the arrays 502, 504a-504d are substantially orthogonal to the radius of the earth.

As further illustrated in FIG. 6, the small satellites 302 are all positioned in the same forward-facing direction 510, which is substantially perpendicular to the planar surface of the bottom array 502. That is, the small satellites 302 are of any shape and have a forward-facing top planar surface. The top surface faces in the direction 510 of the earth, whereby planar surfaces of the remote satellites are substantially orthogonal to the surface of the earth (i.e., orthogonal to the radius of the earth). The array is positioned to cover the nadir areas. For a large footprint, the nadir beam is not directly looking at other domains of the footprint. In order to cover these regions, we provide four more faces, inclined to the nadir plane.

The trapezoid or any equivalent volumetric figure array 500 configuration addresses the signals to the region directly, or nearly so, so that the cosine loss is manageable the signals transmitted to/from the Earth ground station, and reduces cosine losses. The control satellite 200 is located at the center of mass of the array 500. The "cosine loss" is the cosine of the angle of the normal to the plane to the line joining the center of the plane to the region being looked at. Since cosine is always less than or equal to 1, it is always a loss and never a gain, and the more the angle, the greater the loss. The additional planes to 502, 504a-d, in FIG. 6 of the trapezoid are provided to reduce that loss.

It is further noted that the bottom 502 and sides 504 are shown as flat having planar dimensions and angled corners where they intersect. It should be noted that the shape can be more curved, with curved dimensions and curved corners as form by an ellipse. And other configurations of the array can be provided having different array shapes, including three-dimensional shapes or polymetric shapes. In addition, the array 500 can be oriented with respect to the Earth in any suitable manner to point to either earth 510 or space 512.

FIGS. 7(a)-7(c) show Ephemeris-based beam-to-sub-formation assignment use on a broadband communications applications of the invention, where FIG. 7(a) shows the formation entering the footprint on Earth, FIG. 7(b) shows the formation in the middle of the footprint, and FIG. 7(c) shows the formation leaving the footprint. The boundaries in the footprint show the sub-formation being used to cover the beams. Here, beam Tx and Rx are switched to/from the selected formation. The switch may be communicated by the central satellite 200. The figures shows the satellite transit of footprint centre, but off-center footprint transit is possible as well. The figure illustrates the assignment of beams to the various faces of the frustum as the formation passes over the footprint. It also illustrates that not all active faces of the frustum are necessarily active at any given time.

Figure 8A:
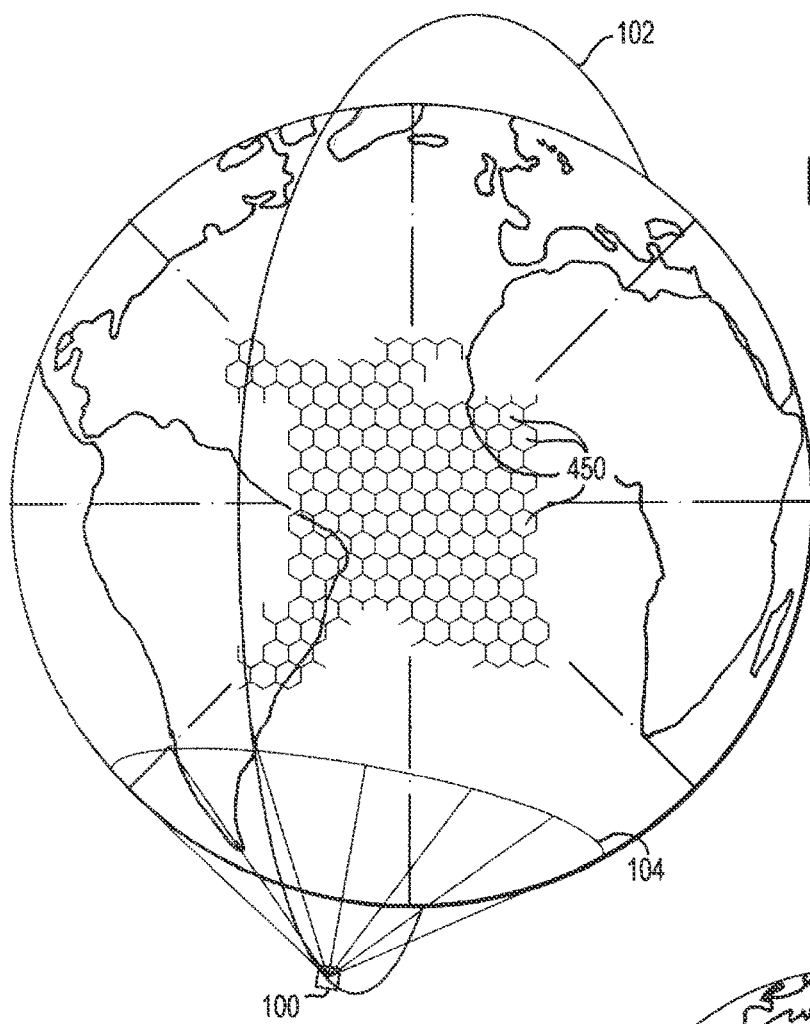
FIGS. 8(a), 8(b), 8(c) show beam switching.
Figure 8B:
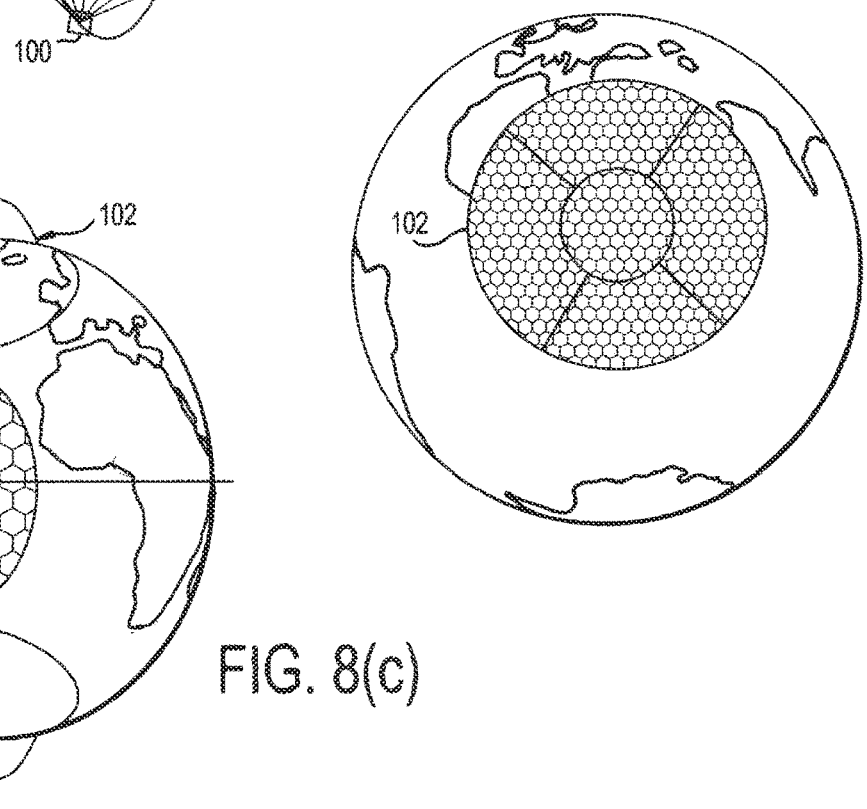
Figure 8C:
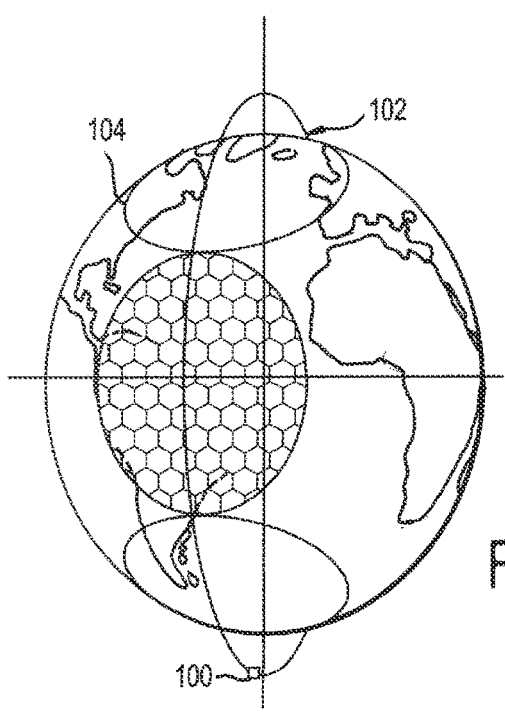

FIGS. 8(a), 8(b) show an alternative communication protocol to FIGS. 5, 7 as a further non-limiting example of a beam switching operation. In FIG. 8(a) (as in FIGS. 5, 7), the entire earth is mapped into numerous beams 450 and assigns each beam a unique beam index. That information can be stored in memory at the control satellites 200. The satellite formation 100 is shown in orbit 102 around the earth. As the formation 100 travels in orbit 102, its footprint 104 moves along the surface of the earth, whereby the satellite formation 100 can communicate with the beams 450 that are inside its footprint 102. Thus, as the satellite formation orbits the earth, the footprint 104 of the satellite formation 100 moves from the position shown in FIG. 8(a) to the position shown in FIG. 8(b). In addition, referring to FIG. 8(c), there can be multiple satellite formations 100 in a single orbit 102. As illustrated in FIG. 8(c), six satellite formations 100 (three are shown on the half of the earth that is illustrated) can be in a single orbit 102. The footprints 104 of the satellite formations 100 do not overlap with each other.

Each beam 450 is uniquely allocated to only one satellite formation 100 based on the latitude and longitude of the beam 450 and the position of the satellite formation 100. When multiple satellite formations 100 can service a beam 450, the beam 450 can be allocated to a satellite formation 100 that can provide coverage for the longest duration.

Figure 9A:
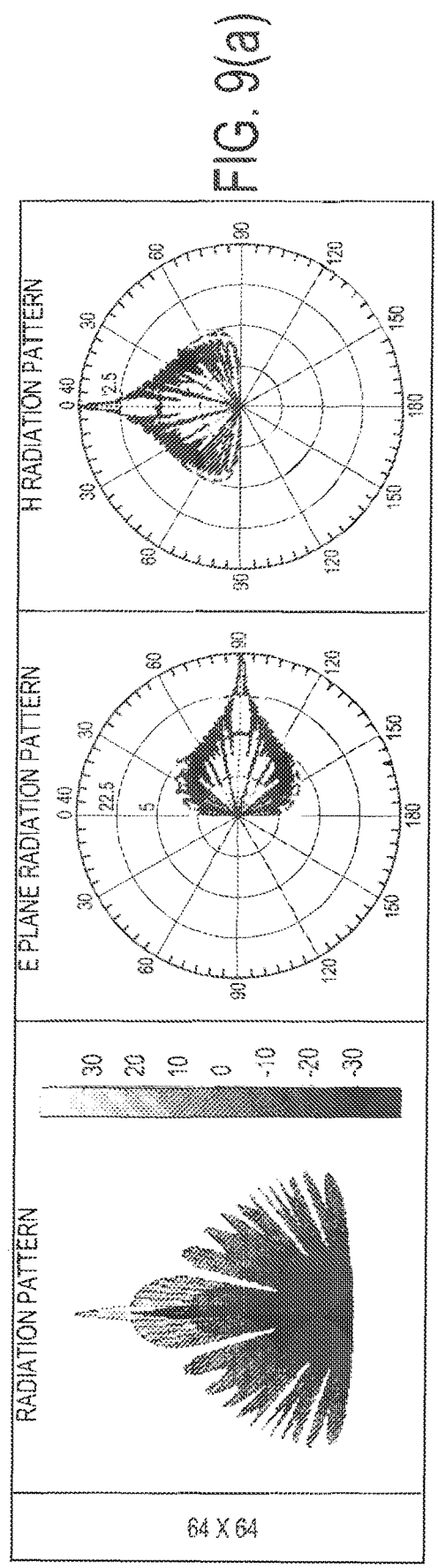
FIGS. 9(a), 9(b) show radiation patterns.
Figure 9B:
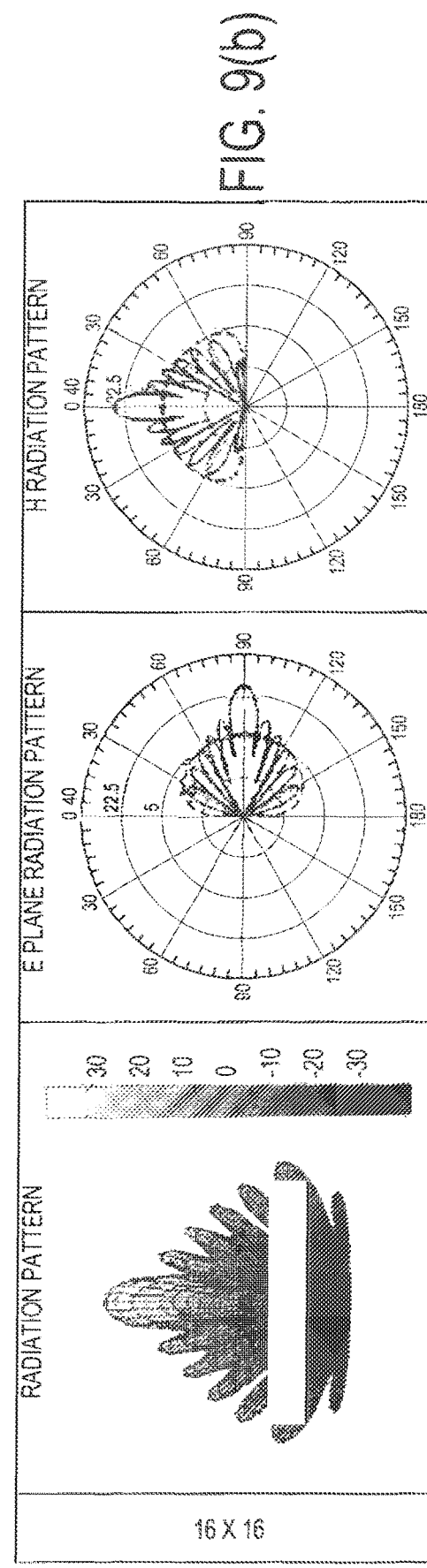

FIGS. 9(a), 9(b) show radiation patterns (a radiation pattern is the antenna array gain as a function of its angle from the array's boresight) for a 64×64 element array and 16×16 element array, respectively. One possible patch (or printed-circuit board) antenna size is 80 mm×80 mm×2 mm, the element spacing is 166 mm, and the frequency is 700 MHz. A patch antenna one type of antenna that can be realized on a PCB. There are several other types, such as microstrip etc., that can be realized on a PCB. The composite radiation pattern of a 64×64 antenna is depicted. What is shown is the narrow main lobe and much smaller surrounding sidelobes. It may be one design choice to select the angle of the frustum so that one array is in another's null. The radiation pattern also shows where the nulls are.

Figure 10:
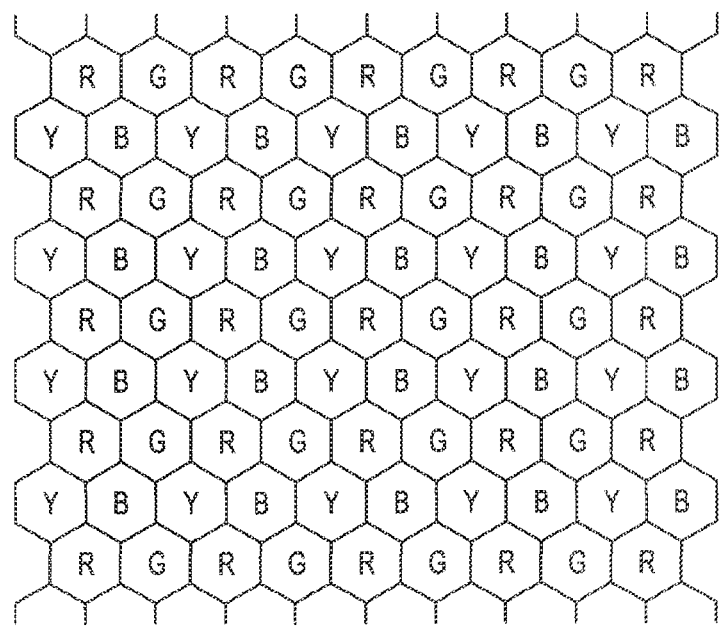
FIG. 10 shows the footprint cell frequency layout.

Turning to FIG. 10, frequency assignment is shown for the footprint of the array 300, for the transmit and receive frequencies Tx, Rx (which can communicate on a same band, but different frequencies). The 4-color configuration is shown, where each color represents a different frequency. Thus, only four colors (i.e., frequencies) are needed to color any 2-dimension map in such a way that no two adjacent cells have the same frequency. If the beams are hexagonal cells, then only 4 frequencies suffice (and they are regular with alternation of 2 frequencies on one row and an alternation of 2 other frequencies on the next, alternating the rows). Thus, frequency reuse factor may optimally be 4. However, even when the interference is restricted to adjacent cells, it has been shown that the problem of optimal coloring of the interference graph G is NP-complete. Several approximation algorithms have been devised for fixed assignments. Fixed Allocation (FA) uses no more than three times the optimal number of frequencies (or colors). We take frequency reuse factor of 7, bearing in mind that it could be brought down to 4 (since satellite beams closely follow a hexagonal grid and interference skipping one cell is small). The four frequencies can accommodate b beams (e.g., 500). Assuming each beam b can handle bandwidth bw, then the entire throughput will be b×bw for each cell. Of course, any suitable number of frequencies and footprint cells can be provided, more or less than four.

Delay and Doppler Pre-Compensation by Formation is performed at the central satellite 200. The satellite formation, knowing its ephemeris, pre-compensates delay and doppler variations to the center of each beam of the footprint it is serving, so as to minimize the residual Doppler seen by a handset anywhere within that beam and so that the delay seen by the handset is as close to a constant delay as possible. Residual Doppler and delay variations, after pre-compensation for the center of the beam (as a function of the formation ephemeris with respect to the center of each beam). As a consequence, the hand-phone will see delay and Doppler variations at off-center locations, but these will be small (of the order of three times what might be observed in a terrestrial base-station service).

Figure 11:
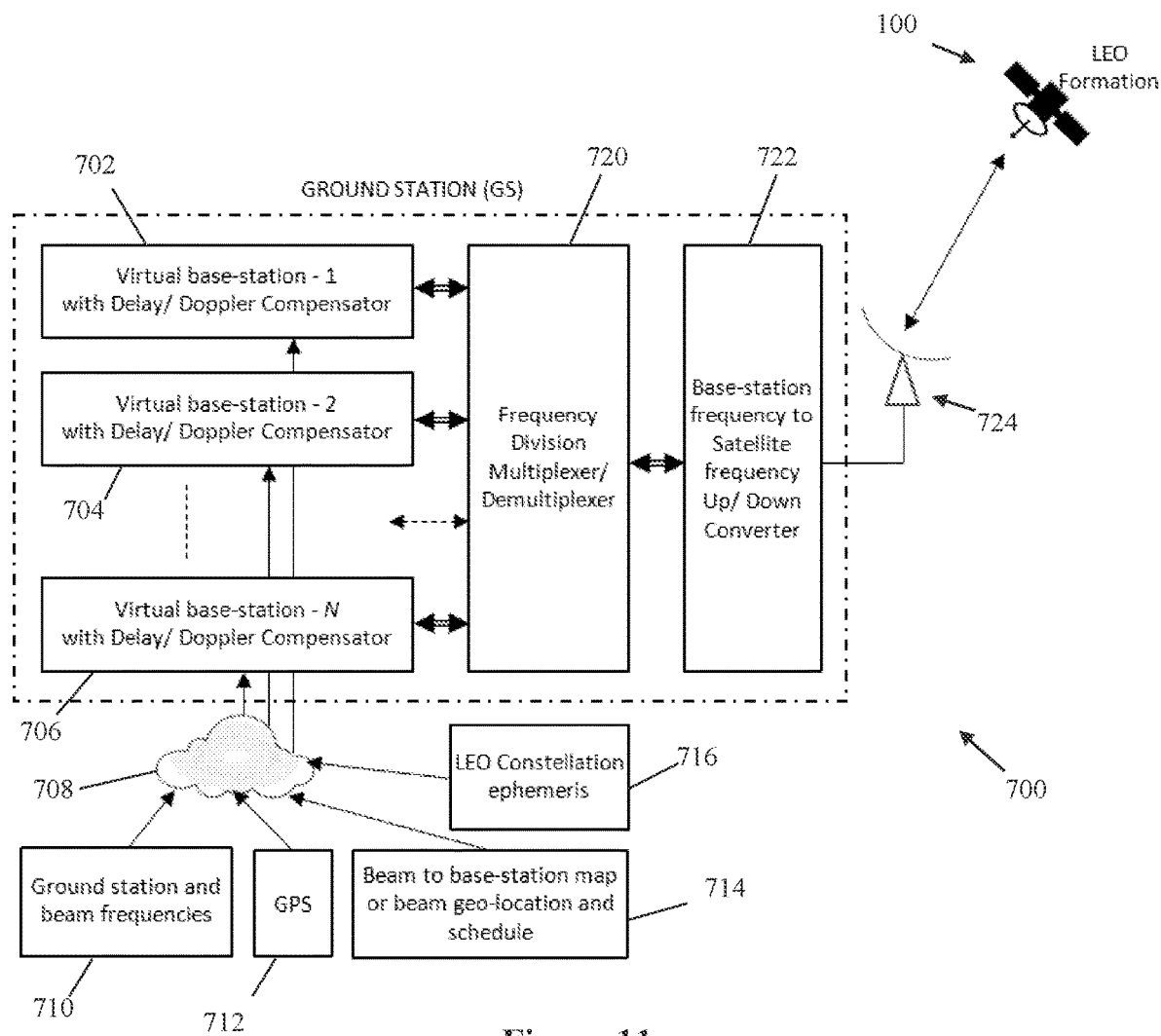
FIG. 11 is a block diagram of a ground station having Doppler compensation.

Alternatively, these delay and Doppler compensation could equally be made at the ground station (GS), such as a virtual Base-Station, as shown in FIG. 11. This is combined with the large aperture and delay/Doppler compensation to the beam-center. The larger the aperture, the smaller the (worst-case) residual Doppler (after residual Doppler compensation) in the beam. LTE does not tolerate residual Doppler>1200 Hz nor delay variations>0.5 ms. So, a) there has to be delay/Doppler compensation/equalization and b) the residual delay/doppler variations must be small. The method of compensation at the ground station can be the same as the compensation done at the satellite.

FIG. 11 shows the organization of equipment at the ground station (GS) 700 that generate the various beam signals and transmit to the LEO formation 100 and receive the various beam signals from LEO formation 100. The virtual base-stations 702, 704, . . . , 706 are N base-stations that generate/receive the signals to/from the handsets in N beams of satellite footprint through the LEO formation 100. Each base-station transmitted/received signal goes through a delay/Doppler compensation aided by inputs from the GPS module 712, LEO constellation ephemeris module 716, ground station and beam frequency module 710, and beam to base-station map or beam geo-location and schedule module 714. The GPS module 712 provides the location co-ordinates of the ground station 700, and the LEO Constellation ephemeris 716 provides the LEO formation 100 co-ordinates. The ground station and beam frequencies module 710 provides a list of the ground station uplink/downlink frequency assigned to each base-station to/from the LEO formation 100 and corresponding uplink/downlink frequency assigned to each beam in the satellite footprint to/from the LEO formation 100. The beam to base-station map and schedule module 714 lists which beam is assigned to which base-station and the time instances when a base-station starts generating/receiving a signal to/from the beam and when it is stopped.

The inputs 710, 712, 714, 716 aid in computing the delay/Doppler trend well ahead of the satellite passes over the beam. For Doppler compensation, when the satellite pass starts over the beam, the inverse Doppler is applied to the virtual base-station generated signal that cancels Doppler effect due to LEO formation movement in the forward direction (from Ground station to LEO formation to User Equipment) resulting in near zero Doppler as seen by the end User Equipment. Similarly, the inverse Doppler is applied on the downlink from LEO formation prior to feeding to virtual base-station to cancel the Doppler effect in the reverse direction (from User Equipment to LEO formation to Ground station).

The compensation is updated periodically to adapt to the Doppler changes during the satellite pass and is carried out till the end of the satellite pass. For delay compensation, a finite latency exists between the Ground Station and the User Equipment as signals are exchanged between them via LEO formation depending on the path delay from the Ground Station and User Equipment to LEO formation. Since this delay cannot be reversed, the delay compensation involves adding a proportionate delay such that overall delay is near constant throughout the satellite pass between Ground Station and User Equipment.

For example, let us assume the Ground Station and the User Equipment are in the same beam. When the beam is at the edge of the LEO formation footprint, the path delay is large (say $d_1$) and the corresponding delay added (say $cd_1$) for compensation is at a minimum. Similarly, when the beam is at nadir (below the LEO formation) during the satellite pass, the path delay is minimum (say $d_2$) and the corresponding delay added (say $cd_2$) for compensation is at a maximum. For these illustrated scenarios, though the path delay varied depending on the beam position in the LEO formation footprint, the overall path delays are nearly constant, i.e., $(d_1+cd_1) \approx (d_2+cd_2)$. Thus, the invention provides a dynamic and variable delay based on the existing path delay, to achieve a nearly constant final resulting path delay as the satellite travels.

So, the delay/Doppler compensation mechanisms aid in maintaining near constant path delay and near zero Doppler (i.e., equalized) between virtual base-stations and the User Equipment required to establish communication between them despite having a LEO formation channel between them. Here, near zero Doppler and near constant delay means Doppler and delay variation that does not disrupt or severely degrade LTE communications. For fixed terrestrial services, in one embodiment they are within ±800 Hz, ±10.2 ms and for airborne mobile services within ±1100 Hz, ±0.3 ms.

Likewise, the virtual base-stations communicating with other beams and virtual base-stations at other ground stations also maintain a near constant path delay and near zero Doppler for the respective LEO formations in constellation. Since the overall path delay/Doppler is maintained to be near similar across beams and across LEO formations, the User Equipment quickly synchronize to new beams whenever there is transition of a User Equipment between beams or transition of a beam from a setting LEO formation footprint to a rising LEO formation footprint, thereby providing a smooth transition from satellite to satellite of User Equipment.

All these inputs are obtained over a local area network or over a cloud from the remote network 708. The signals of each base-station 702, 704, . . . , 706 could be a common LTE band frequency (f) they are interleaved/de-interleaved in frequency to/from ($f_1, f_2, \ldots, f_N$) using frequency division multiplexer/de-multiplexer 720. The composite signal of all base-stations from/to the multiplexer/de-multiplexer 720 is then frequency shifted to/from a leased satellite frequency band (like Q or V-band) by the base-station frequency to satellite frequency up/down converter 722. The ground station antenna 724 transmits/receives the composite base-station signals to/from the LEO formation 100.

As described above, a central satellite 200 is utilized to control operation of the remote satellites 302, such as to control formation, i.e., positioning of the small satellites 302 to form the satellite array 300, 500, including spacing between the respective remote satellites 302. It should be noted, however, that remote satellites 302 (i.e., the remote controller 304) can communicate with one another to perform certain operations, including formation of the satellite array 300, 500, instead of or in addition to utilizing the central satellite 200. Still other components can be provided in the remote satellites 302, such as a proximity detector or sensor, to facilitate formation of the remote satellites 302 to achieve a predetermined or dynamic position between the remote satellites 302. Formation of the array can be predefined or dynamically adjusted.

The large antenna array 300, 500 effectively operates as a large antenna for the control satellite 200, which itself is a small satellite. As such, the antenna array 300, 500 enables enhanced communication between the control satellite 200 and the Earth. Accordingly, the control satellite 200 can transmit and receive signals directly to low-powered antenna devices, such as cell phones or the like.

In yet another embodiment of the invention, the phase array 300, 500 can be utilized to collect solar energy from the sun. For example, the satellites 302 or satellite modules can be made from photovoltaic material or other material that converts solar energy to electrical energy to operate as a solar panel, and also operate as an antenna structure (or other structure of the satellite or satellite module) to transmit and receive signals in accordance with the invention. The electrical energy is used to power the satellite 302 or satellite modules or stored for later use. Thus, the same structure can be used for solar energy and for operation as a satellite antenna.

In addition, the invention can be used to support ground virtual eNodeB to compensate for large delay and support standard devices in 2G, 3G, 4G, and 5G. In more detail, in order for the invention 100 to communicate with end user devices on the ground such as mobile devices, it utilizes Doppler compensation and equalized delay. Yet, standard communication protocols are only capable of handling communications in systems where transmissions are received quickly with small delays, such as within 0.66 ms. But in the present invention, there is a large communication delay between the remote satellites or satellite modules and the end user devices. That large transmission delay creates errors when sending signals according to standard communication protocols. So, the invention utilizes a communication protocol to allow for seamless communication despite large transmission delays across 2G, 3G, 4G and 5G systems, such as shown and described in U.S. Provisional Application No. 62/758,217 filed Nov. 9, 2018, and the non-provisional application Ser. No. 16/379,399, filed Apr. 9, 2019, now U.S. Pat. No. 10,841,890, the entire contents of which is hereby incorporated by reference. The combination of Doppler compensation, equalized delay, and a delayed-transmission communication protocol, enables seamless, continuous and reliable communication between the remote satellites 302 or satellite modules and user ground devices. The protocol can be implemented at the ground station and/or at the satellite or satellite module.

As further described above, the remote satellites 302 or satellite modules can be moved into position and retained in position by using, for example, electromagnetic forces. Still further, the remote satellites 302 or satellite modules can be moved into position or held in position by mechanical devices. For example, the remote satellites 302 or satellite modules can physically engage each other to create movement, and can be mechanically engaged or attached to one another as each remote satellite moves into its final operating position. For example, the remote satellites 302 or satellite modules can be coupled together by a mechanical mechanism such as a hinge or the like that rotatably connect the satellites to pivot or rotate about the mechanism with respect to one another. Thus, the connected satellites 302 or satellite modules can be folded onto each other into a small compact storage or transport configuration, and then mechanically unfolded into a large operating configuration.

Each remote satellite 302 or satellite module can be, for example, a micro satellite or antenna that is mechanically and rotatably coupled to at least one neighboring satellite 302 or satellite module. Each remote satellite 302 or satellite module can have multiple neighboring remote satellites 302 or satellite modules, such as four on each side and possibly one above, below and at diagonals. Each remote satellite or satellite module can have a mechanical mechanism or device connecting it to at least one of its neighboring remote satellites or modules in a manner that provides an efficient folding of the remote satellites or satellite modules into a compact storage configuration. It is further noted that the remote satellites or modules can be connected in other suitable manners to permit rotation or other relational movement, such as for example sliding, pivoting, extending, collapsing.

It is further noted that the term "satellite" and/or "satellite module" are generally interchangeably used to describe the remote satellites 302 as an element, object or device that can be placed into space. Though the preferred embodiment is described above as including a processor 304, receiver(s)/transmitter(s), and up to four antenna 305, other embodiments need not include each of those components. Moreover, in one embodiment, the satellite or satellite module can comprise just one of those components. For example, the satellite or satellite module can be an antenna, a portion of an antenna, or any other element, object, device or component that is placed into space, typically to support, for example, communication with other satellites, ground station, and/or end user device.

In the embodiment of FIGS. 1-2, the remote controller and/or the central controller can include a processing device to perform various functions and operations in accordance with the invention, including at the ground station 700 and the inputs 710-716 to the base stations 702-706. The processing device can be, for instance, a computing device, processor, application specific integrated circuits (ASIC), or controller. The processing device can be provided with one or more of a wide variety of components or subsystems including, for example, a co-processor, register, data processing devices and subsystems, wired or wireless communication links, and/or storage device(s) such as memory, RAM, ROM, analog or digital memory or database. All or parts of the system, processes, and/or data utilized in the invention can be stored on or read from the storage device. The storage device can have stored thereon machine executable instructions for performing the processes of the invention. The processing device can execute software that can be stored on the storage device. Unless indicated otherwise, the process is preferably implemented in automatically by the processor substantially in real time without delay.

The description and drawings of the present invention provided in the paper should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A station configured to support direct communication between a set of discrete satellite modules operating in low Earth orbit (LEO) and forming a distributed phased-array antenna with a single aperture and a set of end user devices, the station comprising:
    memory configured to store information including at least one of communication link frequency assignments, beam mapping, or satellite constellation ephemeris information; and
    one or more processors operatively coupled to the memory, the one or more processors being configured to:
        perform, based on the stored information, Doppler compensation to a center or substantially center of each beam that provides communication between the set of end user devices and the distributed phased-array antenna operating in LEO, wherein each beam is associated with a corresponding cell of a set of cells according to the single aperture, so that a Doppler shift for each beam as seen by a respective end user devices of the set of end user devices that is in a given one of the set of cells falls below 1200 Hz; and
        perform, according to the stored information, delay compensation to the center or substantially center of each beam in the given cell so that a delay as seen by the respective end user devices of the set of end user devices is below 0.5 ms.

2. The station of claim 1, wherein the delay pre-compensation is dynamic and variable based on an existing path delay.

3. The station of claim 1, wherein the one or more processors are configured to perform the delay compensation by adding a proportionate delay to achieve a substantially constant delay.

4. The station of claim 1, wherein the one or more processors are configured to periodically update the Doppler compensation while the set of discrete satellite modules passes over a given area.

5. The station of claim 1, wherein:
    communication between the distributed phased-array antenna and the set of end user devices occurs at one or more frequencies in a first frequency band less than 2 GHz: and
    communication between the station and a device other than the set of end user devices occurs at one or more frequencies in a second frequency band higher than the first frequency band.

6. The station of claim 5, wherein the station is incorporated in the set of discrete satellite modules, and the other device is a ground station implementing a virtual base station.

7. The station of claim 5, wherein the station is a ground station implementing a virtual base station, and the other device is incorporated in the set of discrete satellite modules.

8. The station of claim 1, wherein a plurality of beams is associated with the given cell, each of the plurality of beams corresponding to communication with a different end user device.

9. A system configured to support direct communication between a set of discrete satellite modules operating in low Earth orbit (LEO) and forming a distributed phased-array antenna with a single aperture and a set of end user devices, the system comprising:
    one or more processors operatively coupled to memory that is configured to store information including at least one of communication link frequency assignments, beam mapping, or satellite constellation ephemeris information, the one or more processors being configured to:
        perform, based on the stored information, Doppler compensation to a center or substantially center of each beam that provides communication between the set of end user devices and the distributed phased-array antenna operating in LEO, wherein each beam is associated with a corresponding cell of a set of cells according to the single aperture, so that a Doppler shift for each beam as seen by a respective end user device of the set of end user devices that is in a given one of the set of cells falls below 1200 Hz; and
        perform, according to the stored information, delay compensation to the center or substantially center of each beam in the given cell so that a delay as seen by the respective end user device of the set of end user devices is below 0.5 ms.

10. The system of claim 9, wherein the delay pre-compensation is dynamic and variable based on an existing path delay.

11. The system of claim 9, wherein the one or more processors are configured to perform the delay compensation by adding a proportionate delay to achieve a substantially constant delay.

12. The system of claim 9, wherein the one or more processors are configured to periodically update the Doppler compensation while the set of discrete satellite modules passes over a given area.

13. The system of claim 9, wherein:
communication between the distributed phased-array antenna and the set of end user devices occurs at one or more frequencies in a first frequency band less than 2 GHz: and
communication between the system and a device other than the set of end user devices occurs at one or more frequencies in a second frequency band higher than the first frequency band.

14. The system of claim 13, wherein the system is incorporated in the set of discrete satellite modules, and the other device is a ground station implementing a virtual base station.

15. The system of claim 13, wherein the system is a ground station implementing a virtual base station, and the other device is incorporated in the set of discrete satellite modules.

16. The system of claim 9, wherein a plurality of beams is associated with the given cell, each of the plurality of beams corresponding to communication with a different end user device.

* * * * *